July 7, 1942.  F. J. JONES  2,289,123
ADJUSTABLE CUTTER BAR
Filed Oct. 9, 1941  4 Sheets-Sheet 1
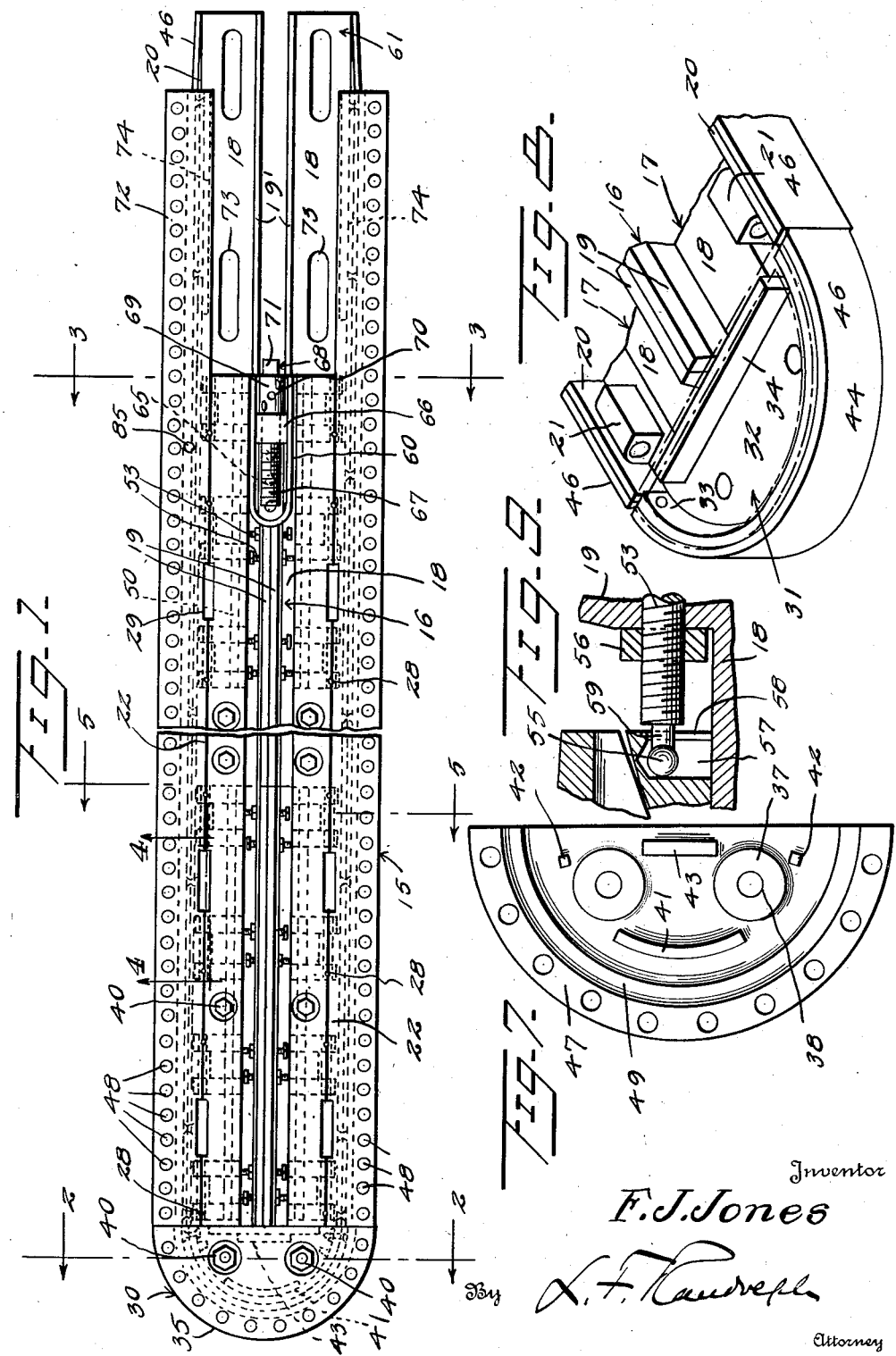
Inventor
F. J. Jones
By L. F. Kandell
Attorney July 7, 1942.  F. J. JONES  2,289,123
ADJUSTABLE CUTTER BAR
Filed Oct. 9, 1941  4 Sheets-Sheet 2
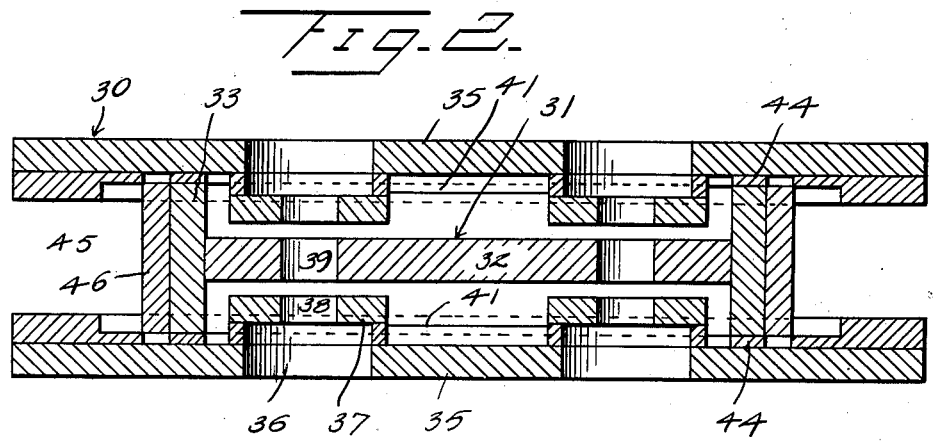
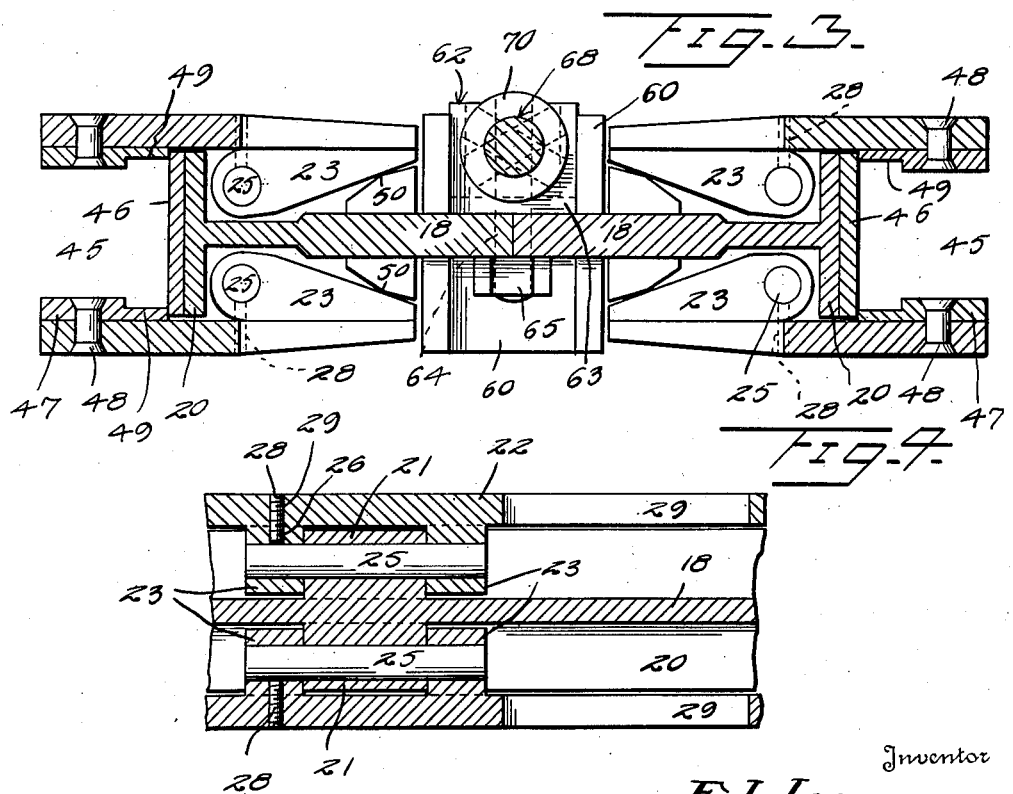
Inventor
F. J. Jones
By [signature]
Attorney

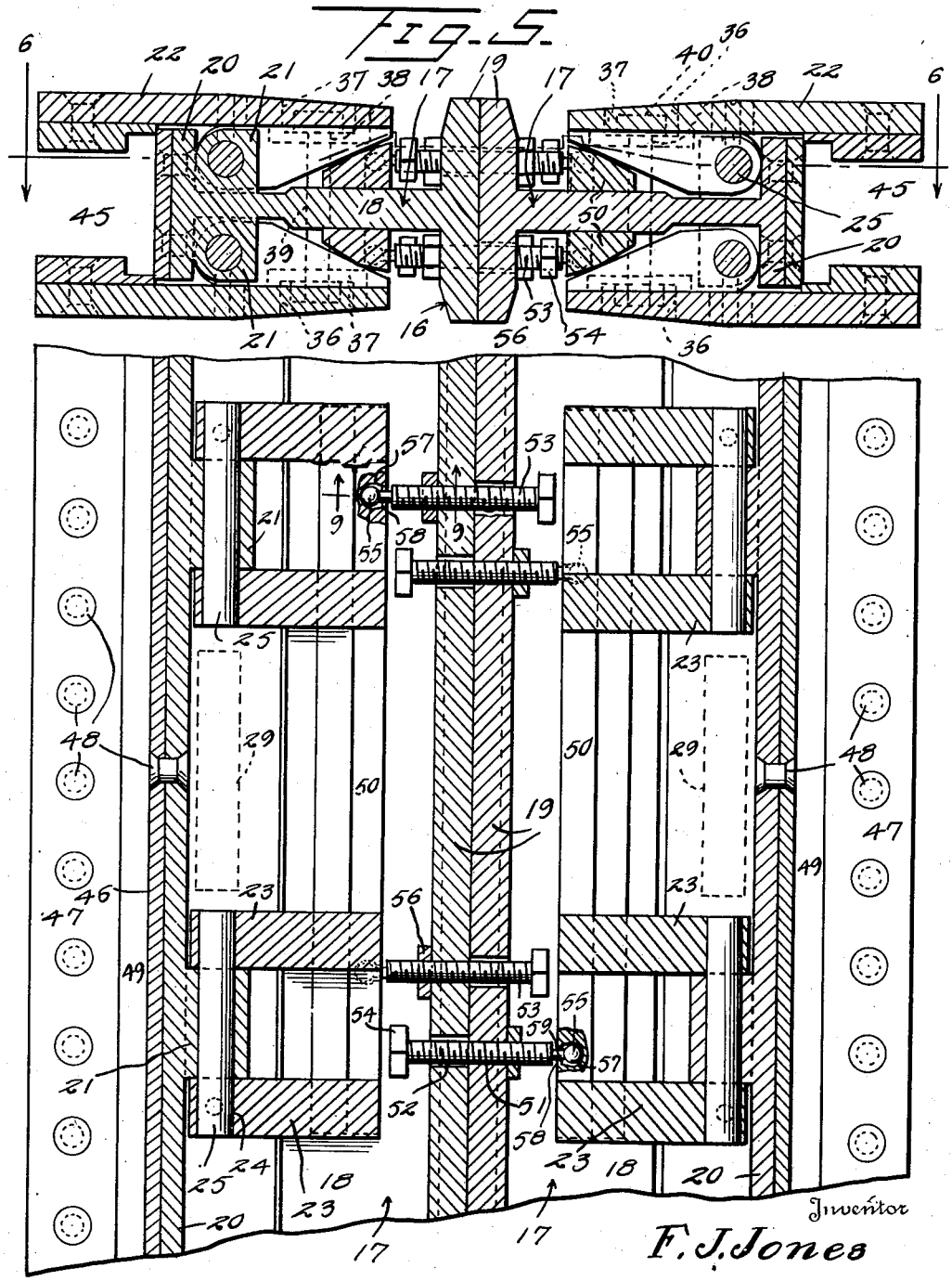

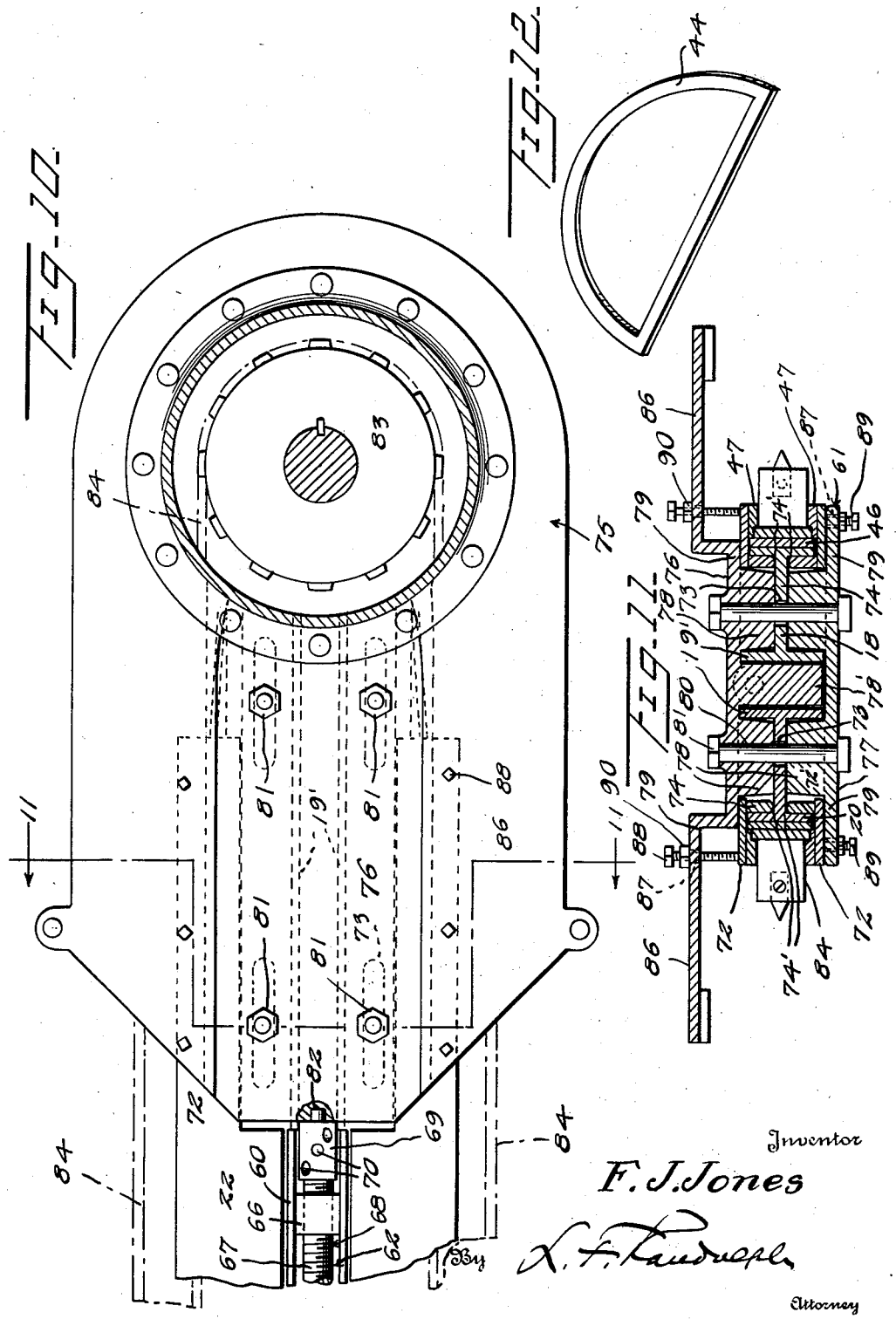

Patented July 7, 1942

2,289,123

UNITED STATES PATENT OFFICE 2,289,123

ADJUSTABLE CUTTER BAR

Frank J. Jones, West Terre Haute, Ind.

Application October 9, 1941, Serial No. 414,374

7 Claims. (Cl. 262—33)

This invention relates to an adjustable cutting bar for use with conventional cutting machines and conventional endless cutting chains driven thereby.

It is a primary object of this invention to provide a cutting bar in which adjustments may be made to take up loose play between a cutting chain, guided by the bar, and the bar to provide means to compensate for wear on the cutting chain and the parts of the bar engaged thereby, said bar being so constructed that adjustment thereof can be made without removing the bar from a cutting machine on which it is mounted.

Another aim of the invention is to provide a bar of simple construction capable of being economically manufactured and sold and which will be durable and capable of being easily adjusted.

Still a further aim of the invention is to provide adjustment means, carried by the bar, for adjustably positioning the bar relatively to a cutting machine on which it is mounted for adjusting the tension on a cutting chain.

Still another object of the invention is to provide a channel in which the cutting chain is adapted to run and which is lined with wear strips constructed to form a T-shaped slot for the cutting chain, and arranged so that the chain does not engage any part of the bar to prevent wear on the bar.

Other objects and advantages of the invention will hereinafter become more fully apparent from the following description of the drawings, which illustrate a preferred embodiment of the invention, and wherein:

Figure 1 is a fragmentary plan view of a cutting bar constructed in accordance with the invention, Figures 2 and 3 are enlarged cross sectional views, taken substantially along the planes of the lines 2—2 and 3—3, respectively, of Figure 1, Figure 4 is an enlarged longitudinal vertical sectional view taken substantially along the plane of the line 4—4 of Figure 1, Figure 5 is an enlarged cross sectional view taken substantially along the plane of the line 5—5 of Figure 1, Figure 6 is a longitudinal horizontal sectional view taken substantially along the plane of the line 6—6 of Figure 5, Figure 7 is a plan view looking toward the inner side of one of the plates on the outer end of the cutting bar, Figure 8 is a perspective view of the base portion of the outer end of the cutting bar and with the cover plates removed, Figure 9 is an enlarged transverse vertical sectional view of a portion of the cutting bar, taken substantially along a plane indicated by the line 9—9 of Figure 6, Figure 10 is a top plan view showing the inner end of the cutting bar attached to a conventional cutting machine, Figure 11 is a cross sectional view taken substantially along the plane of the line 11—11 of Figure 10, and Figure 12 is a perspective view of one of the shims, forming a part of the outer end of the cutting bar.

Referring more particularly to the drawings, wherein like reference characters designate like or corresponding parts throughout the different views, 15 designates generally the improved cutting bar in its entirety, and which includes an elongated base section, designated generally 16. The base section 16 includes two corresponding members 17 which are shaped similarly to a railroad rail, as best seen in Figure 5, and each of which includes a web 18, a flanged base 19 and a flanged head 20. The outer sides of the bases 19 are secured together in abutting engagement in any suitable manner to form the base section 16. However, it will be readily apparent that the two members 17 could obviously be formed integral if desired.

The members 17 are provided at spaced points with bearing members 21, as seen in Figures 5 and 6, which are disposed in the angles formed by the webs 18 and the flanged heads 20, and which may be formed integral with the members 17 or suitably secured thereto, as by welding. The bearings 21 are located at corresponding positions on both sides of the webs 18. A plate 22 is disposed on each side of each of the members 17. The plates 22 are provided on their inner sides, and adjacent their inner edges, with a plurality of pairs of cam strips 23 which are disposed transversely thereof. The strips 23 of each pair of the strips are disposed in spaced relationship to one another and said strips are provided adjacent corresponding ends thereof with openings 24. As seen in Figure 6, the strips of the pairs of strips 23 are spaced so that a bearing 21 will fit between each of said pairs of strips and with the openings 24 thereof alined with the bore of the bearing for receiving a hinge pin 25. Thus, each of the plates 22 is connected in this manner at a plurality of points to a rail shaped member 17 for pivotally mounting the plates 22 relatively to the base section 16. One of the strips 23 of each of the pairs thereof is provided with an outwardly extending threaded opening 26, as best seen in Figure 4, which registers with a threaded opening 27 in the plate 22, to which said cam strip 23 is secured, for receiving a set screw 28 which engages the pin 25, which extends through said strip 23 for detachably holding the pin in engagement with a bearing member 21 and a pair of the cam strips 23. The hinge pins 25 are thus fixedly secured relatively to the cam strips 23 and are turnably mounted in the bearing members 21 for pivotally mounting the plates 22. The plates 22 are each provided with a plurality of elongated slots 29, each of which slots is disposed between pairs of the cam strips 23 to provide means whereby the pins 25 can be inserted or removed for attaching the plates 22 to the base member 16 or for detaching them therefrom.

The bar 15 is provided with an outer rounded end or head, designated generally 30, which includes a substantially D-shaped base section 31 having a web portion 32. The straight side or edge of the web portion 32 is formed integral with or suitably secured to the outer ends of the web portions 18, as best seen in Figure 8. The web 32 is provided with an arcuately shaped flange 33 which is formed integral with or suitably secured to its outer, rounded edge and which extends substantially equal distances from each side of the web 32. The flange 33 forms a rounded continuation of the outer ends of the heads 20 and has its ends in abutting engagement with the outer ends of the heads 20. A strip 34 is secured to or formed integral with each side of the web 32 and is disposed parallel to the straight edge thereof and adjacent said edge. The strips 34 extend upwardly and downwardly relatively to the web 32 and have their outer edges disposed in substantially the same plane as the complementary edges of the flange 33. The parts 32, 33 and 34 combine to form the base section 31 of the head 30.

The head 30 also includes a pair of cover plates 35 each of which is substantially semi-circular in shape. The cover plates 35 are disposed on opposite sides of the base section 31, and are provided with correspondingly disposed openings 36 and inwardly extending socket portions 37 which are provided with openings 38. The openings 38 of complementary socket portions 37 of the plates 35 are disposed in alinement with one another and in alinement with openings 39 for receiving nut and bolt fastenings 40 which are countersunk thereby in the openings 36 and sockets 37. As seen in Figure 7, the inner side, of each of the plates 35, is provided with an arcuately shaped strip 41, two projections 42 and a strip 43. The strip 41 and the projections 42 are adapted to engage against the inner side of the flange 33, and the strip 43 is adapted to engage against the inner side of the strip 34 to hold the plate 35 in a definite fixed position relatively to the base section 31, and to aline the openings 38 with the openings 39. A D-shaped shim 44, as seen in Figure 12, is disposed between each plate 35, and the outer edges of the flange 33 and strip 34, which would otherwise engage said plate 35. The thickness of the shims 44 can be varied, for a purpose which will hereinafter become apparent.

As best seen in Figure 5, the inner edges of the plates 22 are spaced outwardly from the flanges 19 and the outer edges of the plates 22 are disposed substantially beyond the heads 20 so that the outer portions of the plates 22 combine with the heads 20 to form channels 45. Similarly, as seen in Figure 2, the outer rounded edges of the plates 35 are spaced outwardly from the flange 33 to form an arcuately shaped channel 45 which connects the outer ends of the channels 45 which are formed by the plates 22 and heads 20, along each longitudinal edge of the bar 15. Wear strips 46 are secured by means of fastenings, such as rivets, to the outer sides of the heads 20 and flange 33, and complementary wear strips 47 are secured to the inner sides of the portions of the plates 22 and 35, which form the channels 45, by similar fastenings, designated 48. The wear strips 47, on their inner sides and adjacent their inner longitudinal edges are provided with notches or cut-out portions 49. The wear strips 46 and 47 substantially line the channel 45 and produce a channel which is substantially T-shaped in cross section, as seen in Figures 2 and 3.

As best seen in Figures 3, 5 and 6, a plurality of corresponding elongated wedges 50 are loosely mounted on opposite sides of the webs 18 and have flat inner sides which bear against and slidably engage the webs 18. The wedges 50 are provided with inclined outer sides which engage the inclined outer edges of the cam strips 23. As seen in Figure 6, each of the wedges 50 engages two adjacent pairs of cam strips 23, which are attached to the same plate 22.

As seen in Figure 6, the flanges 19 are provided with a plurality of sets of staggeredly arranged drilled openings 51 and enlarged openings 52. An opening 51 alines with each opening 52, and the alined openings 51 and 52 are formed in different flanges 19. Feed screws 53 extend through the alined openings 51 and 52 and threadedly engage the openings 51. Feed screws 53 are provided with headed ends 54 and restricted ball shaped ends 55. The feed screws 53 are alternately arranged to extend in opposite directions through the flanges 19, and the headed ends 54 of each of the feed screws is disposed adjacent to the flange 19 which is provided with the opening 52, through which said feed screw 53 extends. Each of the feed screws 53 carries a lock nut 56 which is adapted to bear against the flange 19 having the threaded opening 51 through which said feed screw extends. The wedges 50 are provided with sockets 57, as best seen in Figure 9, which open outwardly of their inner substantially flat sides for receiving the balls 55, and which are provided with restricted slot-like openings 58 in their inner faces for loosely engaging the shanks 59 of the balls 55. Each of the wedges 50 is provided with two sockets 57, each of which is engaged by a ball 55 and a feed screw 53. As seen in Figure 1, the spaces between the inner longitudinal edges of the plates 22 and the flanges 19 expose the bolt heads 54 and the lock nuts 56 and permit adjustment of the feed screws 53. Consequently, it will be readily apparent, that if the feed screws 53 are turned so that their ball shaped ends 55 move away from the flanges 19, the wedges 50 will likewise be moved away from the flanges 19 and by the cam action with the strips 23 will rock the inner, longitudinal edges of the plates 22 outwardly to thereby rock the outer longitudinal portions of the plates 22, which form portions of the channel 45, inwardly to restrict the channel 45. By providing shims 44, of different thicknesses, the sides of the channel portion 45, formed by the head 30, can be varied to correspond to the sides of the channel portions 45 which are formed in the opposite, longitudinal edges of the bar 15. The plates 22 are each provided with a plurality of openings 36, sockets 37 and openings 38, corresponding to the similarly designated parts of the plates 35. Likewise, the webs 18 are provided with openings 39, corresponding to the openings 39 in the web 32 so that the oppositely disposed plates 22 can be connected by means of nut and bolt fastenings 40, as best seen in dotted lines in Figure 5. The heads and nuts of the last mentioned fastenings 40 are countersunk in the openings 36 of the plates 22. Said last mentioned fastenings 40 are loosened in order to permit adjustment of the plates 22 by outward movement of the wedges 50, and are thereafter tightened to cooperate with the wedges for holding the plates 22 securely in adjusted positions. After the feed screws 53 have been adjusted the lock nuts 56 are moved into abutting engagement with the flanges 19 to retain the feed screws in their projected positions.

Near the opposite, inner end of the bar 15, the flanges 19 terminate in a U-shaped flange 60, on each side of the webs 18. The U-shaped flanges 60 are disposed longitudinally of the bar 15 and open toward the inner end 61 thereof. Beyond the inner ends of the flanges 19, the webs 18 of the members 17 have their inner longitudinal edges in abutting engagement, as best seen in Figure 3. The uppermost U-shaped flange 60 is adapted to receive an adjusting screw holder 62, the base 63 of which rests on the portions of the webs 18 which are disposed between the U-shaped flanges 60. Said portions of the webs 18 and the base 63 are provided with openings 64 which are adapted to be arranged in alinement for receiving nut and bolt fastenings 65 for securing the holder 62 in the upper U-shaped flange 60. Holder 62 is provided with a head 66 in which is formed a threaded opening, not shown, for receiving the threaded shank end 67 of an adjusting screw 68, which is disposed in said upper U-shaped member 60 and longitudinally of the bar 15. The adjusting screw 68 is provided with an enlarged head 69 which is disposed adjacent the open end of the upper U-shaped flange 60 and on the outer side of the head 66. The screw head 69 is provided with a plurality of openings 70 in the periphery thereof which are adapted to receive a turning tool, such as tommy bar, not shown, for adjustably positioning the screw 68 relatively to the upper U-shaped flange 60 and the holder 62. A restricted stem or shank 71 projects from the outer end of the head 69, as seen in Figure 1.

Beyond the open ends of the U-shaped flanges 60, toward the inner end 61 of the bar, the plates 22 have their inner longitudinal edge portions cut-out to form extensions 72 which constitute integral continuations of the outer portions of the plates 22. Said extensions 72 combine with the inner end portions of the heads 20 to form the inner ends of the channel 45, as best seen in Figure 11.

Beyond the open ends of the U-shaped flanges 60, the members 17 are provided with laterally spaced longitudinally extending flanges 19'. The adjacent portions of the webs 18 terminate at the flanges 19' to provide an uninterrupted space between flanges 19'. As best seen in Figure 1, the portions of the webs 18 which are disposed between the flanges 19' and the heads 20 are provided with elongated longitudinally extending slots 73, which are spaced inwardly relatively to the extensions 72. An elongated strip 74 is secured to the inner side and adjacent the inner edge of each of the extensions 72, and extends longitudinally thereof, as indicated in dotted lines in Figure 1. As seen in Figure 11, the strips 74 abut against the inner sides of the heads 20 and have their inner, adjacent edges in engagement with the webs 18.

The inner end 61 of the bar 15 is adapted to be fastened to a conventional cutting machine, portions of which are shown in Figures 10 and 11. The cutting machine, designated generally 75, includes the machine parts 76 and 77, between which the end 61 is adapted to be disposed. The machine parts 76 and 77 are provided with complementary inwardly extending ribs 78 which are adapted to be disposed between the flanges 19' and the heads 20 and which are adapted to abut against the sides of the webs 18. The machine part 76 is also provided with an intermediate longitudinally extending rib 78' which is disposed in the space between flanges 19' and which extends downwardly to adjacent the inner side of the machine part 77, as seen in Figure 11. The machine parts 76 and 77 have portions 79 which engage the inner longitudinal edges of the extensions 72. The machine parts 76 and 77 are provided with alined openings 80 for receiving nut and bolt fastenings 81 which extend loosely through the slots 73. The fastenings 81 are adapted to be tightened for clamping the inner portions of the extensions 72 between the portions 79. The strips 74 by engagement with the webs 18 prevent the extensions 72 from being forced inwardly by pressure on the portions 79. Said strips 74 also function to prevent the extensions 72 from moving laterally outwardly relatively to the bar 15.

The outer end of the central rib 78 of the machine part 76 is provided with a socket 82 to receive the stem or shank 71 of the adjusting screw 68.

The cutting machine 75 includes a driven sprocket 83 over which is trained an endless cutting chain 84 of conventional construction. Aside from the socket 82, the machine 75 and chain 84 are of conventional construction and form no part of the invention, but are shown and described merely to illustrate the application of the cutting bar 15. The chain 84 extends through the channel 45 and is slidably mounted therein, and as seen in Figure 11, the chain 84 is shaped to fit snugly in the T-shaped channel 45. The ends of the heads 20 and wear strips 46 are tapered, as seen in Figure 1, to permit the chain 84 to more readily move into and out of engagement with the bar and the notches 49 are likewise flared at the inner end of the bar 15, as seen in dotted lines in Figure 1, to permit the chain to more readily enter and move out of the channel 45. One of the plates 22 is preferably provided with a lubricating opening 85 which opens into a portion of the channel 45 to permit the chain 84 to be lubricated.

From the foregoing it will be obvious that the bar 15 will form a supporting guide for the endless cutting chain 84, and as seen in Figure 11, the cutting chain will not contact any part of the bar 15 except the wear strips 46 and 47 so that these parts, which are replaceable, will be subjected to all of the wear. It will likewise be readily obvious that the channel 45 can be restricted, as previously explained, to compensate for wear on the chain and on the wear strips. The chain 84 can be tensioned by loosening the fastenings 81 and turning the adjusting screw 68 to move it toward the machine 75 so that the adjusting screw will force the cutting bar 15 away from the machine. When the chain has been properly tensioned in this manner the fastenings 81 are tightened to retain the bar 15 in adjusted position relatively to the machine 75.

In order that the extensions 72 can be adjusted with the plates 22 for varying the size of the channel 45, said extensions 72 are provided with rounded edges 72' and the inner edges of the strips 74, which engage the webs 18, are rounded as seen 74' (Figure 11). The upwardly offset flanges 86 of the part 76 are provided with threaded openings to receive set screws 88 which bear against the upper extensions 72. The portions 79 of the part 77 are provided with similar openings 87 to receive set screws 89 which bear against the lower extensions 72. The set screws 88 and 89 carry lock nuts 90 for holding them in adjusted positions. By loosening fastenings 81, set screws 88 and 89 can be advanced for rocking the outer edges of extensions 72 inwardly to restrict the portions of the channel 45, formed thereby. The rounded edges 72' and 74' permit parts 72 and 74 to rock relatively to the parts that they engage. Lock nuts 90 and fastenings 81 are then tightened to hold extensions 72 in adjusted positions.

It will be readily obvious that both sides of the bar 15 are identical so that either side thereof may form its upper or under side, and as the adjusting screw holder 62 is movable it can obviously be mounted in either U-shaped flange 60 which happens to be the upper side of the bar 15.

Obviously, the bar 15 may be made in various lengths, depending upon the length of the cutting chain 84, and the number of wedges 50 and feed screws 53 as well as the number of other parts associated therewith could of course be varied, depending upon the length of the cutting bar.

Various modifications and changes are contemplated and may obviously be resorted to, provided they fall within the spirit and scope of the invention as hereinafter defined by the appended claims, as only a preferred embodiment of the invention has been disclosed.

I claim as my invention:

1. A cutter bar for cutting machines comprising an elongated bar provided with a rounded end, said bar having a channel extending around its outer edge, said channel being provided with ends opening outwardly of the opposite end of the bar and forming a guide for an endless cutting chain, driven by a cutting machine, said bar being provided with pairs of plates having complementary portions forming the sides of said channel, said plates being hingedly mounted, and means for urging the channel forming portions of the plates inwardly of one another for restricting the size of the channel.

2. In a cutter bar for endless chain cutting machines, said bar being provided with an outwardly opening channel in which an endless chain is adapted to run, said channel being provided with wear strips disposed in the bed and sides thereof and lining the inner side of said channel, means for fastening said wear strips to the bar, and the wear strips, connected to the sides of the channel being provided with recessed portions formed in their exposed sides and adjacent their inner, longitudinal edges so that said wear strips combine to form a channel which is substantially T-shaped in cross section.

3. A cutting bar for supporting and guiding an endless cutting chain driven by a cutting machine, said bar being provided with an elongated base portion having a flange at each side edge thereof and extending longitudinally thereof, said flanges being arranged at substantially right angles to the plane of the base portion and being disposed to project from opposite sides thereof, plates pivotally connected to the base portion and projecting beyond the outer sides of said flanges and combining therewith to form a channel adapted to receive the endless cutting chain, and means for rocking said plates relatively to the base portion for varying the size of the channel.

4. A cutting bar as in claim 3, said base member being provided with a longitudinally extending flange disposed intermediate of its longitudinal edges and projecting from opposite sides thereof, feed screws mounted in said last mentioned flange, wedge members carried by said feed screws, and cam members projecting from the inner sides of said plates and disposed to be engaged by said wedge members for rocking the outer edges of the plates inwardly when the wedge members are moved outwardly, said last mentioned flange, feed screws, wedge members and cam members combining to form said means.

5. A cutting bar for use with a cutting machine and endless cutting chain, comprising a bar having one end adapted to be connected to a cutting machine, the opposite end of said bar being rounded, a channel extending substantially around the outer edge of the bar and having outwardly opening ends, adjacent the first mentioned end of the machine and adapted to form entrance and exit openings for the cutting chain, said channel being adapted to form a guide and support in which the cutting chain is movably mounted, and means for varying the size of the channel whereby the chain will be properly engaged and held in the channel of the bar.

6. A cutting bar for use with cutting machines and endless cutting chains driven thereby, comprising a base section extending longitudinally of the bar, plates hingedly connected to said base section on opposite sides thereof and adjacent its opposite edges, said plates extending outwardly beyond the edges of the base section and combining therewith to form a channel in which a cutting chain is adapted to run, wedges disposed between the inner portions of said plates and the base section, and follower screws carried by the base section for moving the wedges relatively to the plates, said wedges engaging said plates for rocking the plates relatively to the base section for varying the cross sectional size of the channel.

7. A cutting bar as in claim 6, the inner, longitudinal edges of said plates being spaced from one another to form elongated openings for exposing said screws and to permit adjustment of the screws with the bar assembled.

FRANK J. JONES.